Oct. 22, 1929.　　　T. C. LUTON　　　1,732,758
MEANS FOR PREVENTING AEROPLANES FROM TAKING NOSE DIVES
Filed June 13, 1928
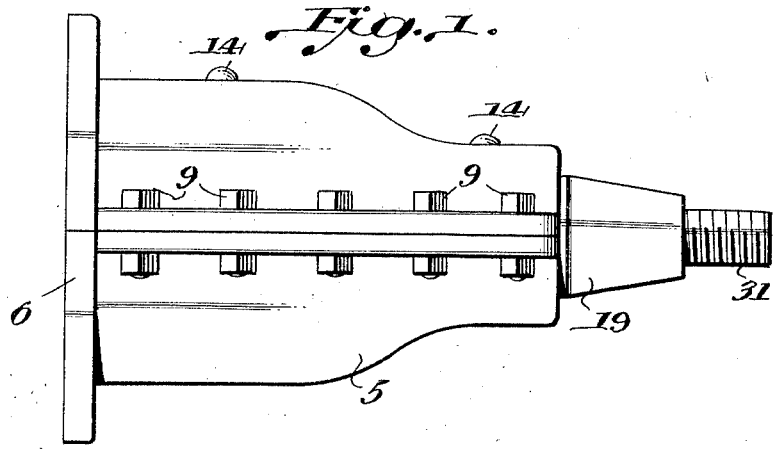
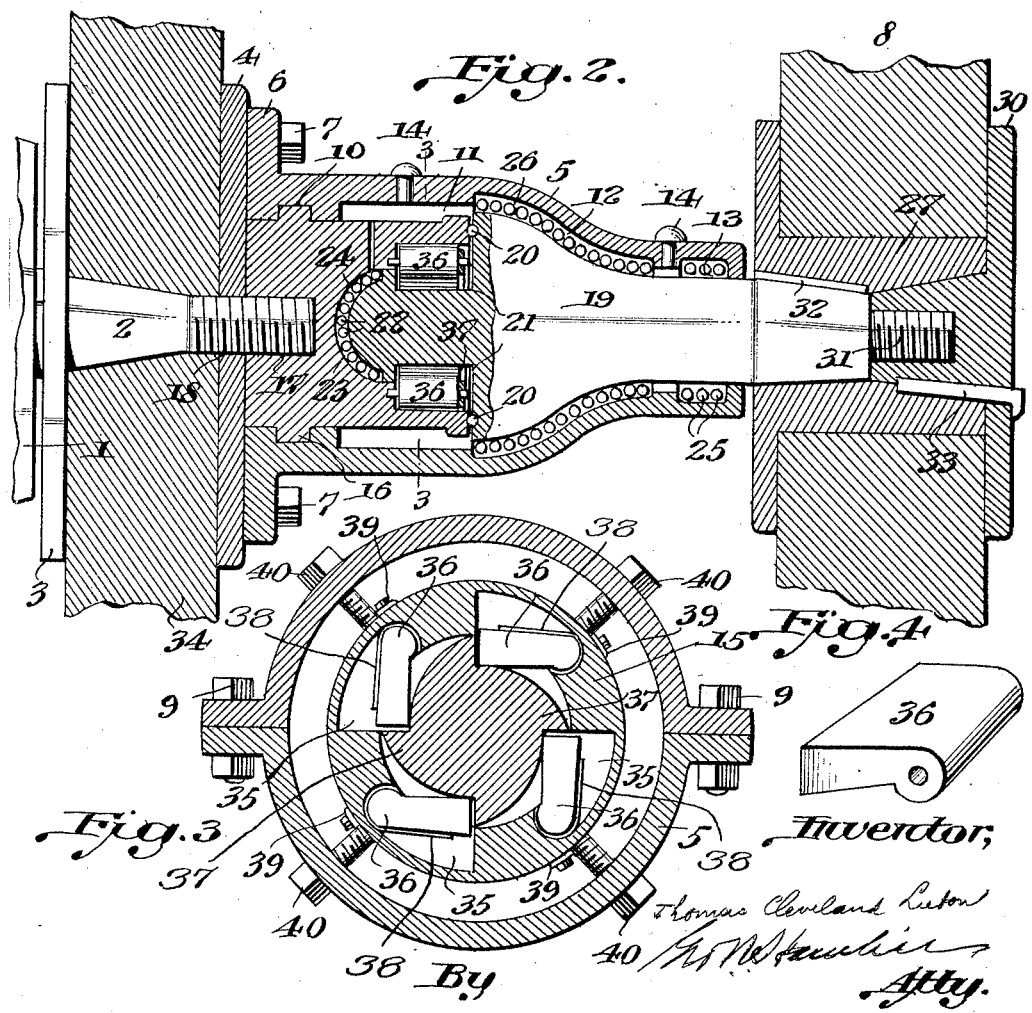

Patented Oct. 22, 1929

1,732,758

UNITED STATES PATENT OFFICE

THOMAS CLEVELAND LUTON, OF EVANSVILLE, INDIANA

MEANS FOR PREVENTING AEROPLANES FROM TAKING NOSE DIVES

Application filed June 13, 1928. Serial No. 285,131.

The object of this invention is to provide an improved simple and efficient means for connecting a supplemental or auxiliary propeller to the main propeller shaft of an aeroplane to serve as a stabilizer which will prevent a nose dive or spin or a tail spin should engine or propeller trouble develop and to afford the operator an opportunity to maintain the equilibrium of the aeroplane to a sufficient extent to make necessary repairs or resume flight or effect a safe landing.

The principle of the invention is that of a supplemental or auxiliary propeller and improved means whereby the propeller may rotate with the main propeller during normal engine operation but which will automatically release from the propeller shaft should the engine stop, fail to properly function, or other trouble of that general nature develop. The said auxiliary propeller is adapted to run free of the engine when trouble develops and not being subject to the drag or compression of the engine, it will continue to rotate for a considerable period of time, thereby enabling the operator to maintain the equilibrium of the aeroplane until the machine can be safely brought to earth or its flight resumed.

In carrying out the invention, I provide an auxiliary propeller and improved attaching means for connecting it to the main propeller shaft, said attaching means having relatively rotatable parts provided with anti-friction bearings and provided with an automatic clutch, such as a pawl and ratchet, which will enable the auxiliary propeller to turn with the main propeller during normal operation or to permit automatic disconnection so that the auxiliary propeller may revolve freely should the engine slow down or stop.

In the accompanying drawings:

Figure 1, is a side elevation of the attachment disconnected from the main propeller, the auxiliary propeller not being shown;

Fig. 2, is a longitudinal section showing my improvements connected to the main propeller shaft of an aeroplane, the main and auxiliary propellers being broken away;

Fig. 3, is a cross section on the line 3—3, Fig. 2, showing the pawls and the ratchet; and Fig. 4, is a detail view of one of the pawls.

In Fig. 1 I have shown my device by itself, except that the propeller is not disclosed.

In Fig. 2 the nose of an aeroplane appears at 1, the propeller shaft being shown at 2, said shaft having the usual clamping plates 3 and 4. The casing or shell of my device appears at 5 and is provided with a face plate or base which is secured to the plate 4 by bolts 7.

The auxiliary propeller which is carried by my device appears at 8.

The shell 5 is made in halves which are clamped together by bolts 9.

The sections of the shell 5 have a square channel 10, and oil reservoir 11, ball races 12 and 13, and closures or plugs 14. The forward part of the shell is tapered to assist in taking up the thrust, as will presently appear.

Located within the shell 5 is a collar 15 which has a square flange 16 received in the square channel 10. This collar has an internally screw threaded socket 17 which screws on to the screw threaded end 18 of the propeller shaft 2. The channel 10 and the flange 16 being square, the collar 15 cannot turn within the shell and, in effect, it is solid with the propeller shaft 2. The collar 15 serves as a thrust bearing for the rotary spindle 19 which carries an auxiliary propeller 8, there being provided ball bearings 20 between the shoulder 21 of the spindle 19 and the end of the collar 15, said bearings taking up some of the thrust exerted by the supplemental propeller 8. The inner end of the spindle 19 projects within a cavity in the collar 15 and is provided with a rounded step bearing 22 between which and the step bearing 23 of the collar are located balls 24. The arrangement described constitutes a step or thrust bearing which, with the balls 20, takes up the thrust exerted by the propeller 8.

In addition to the aforesaid anti-friction bearings, there are balls 25 located in the outermost end of the shell 5 which bear on the spindle 19.

Additional means for mounting the spindle 19 so that it may turn freely and easily within the shell 5 when said spindle is not coupled to the collar 15, comprise ball bearings 26 located within the race 12.

The auxiliary propeller 8 is provided with telescoping hub sections 27, 28 respectively formed integral with the clamping plates 29, 30 which engage the propeller. The hub member 28 is provided with screw threaded sockets which receive the screw threaded end 31 of spindle 19. A tapered key 32 located in a seat whose parts are formed in the hub section 27 and the spindle 19, and a larger key 33 received in seats or channels in the hub sections 27 and 28, securely lock the propeller to the spindle 19 but these keys can be removed when the propeller is to be taken off.

The purpose of the invention being to provide an automatic clutch or device which will lock the spindle 19 and the propeller 8 to the shaft 2 and the main propeller 34 when the engine is operating but which will enable the propeller 8 to revolve freely when the engine is stopped and in order that the propeller may not be subject to retardation by the compression of the engine, I provide means for effecting this purpose. As shown, such means comprise a pawl and ratchet mechanism but it is to be understood that any suitable means may be employed.

As shown, the collar 15 is provided with pockets 35 (Fig. 3) and there are pawls 36 which are rockably seated in one end of each pocket, said pawls being adapted to be received in the pockets to free the spindle 19 when the shaft 2 slows down or stops. The spindle 19 is provided with ratchet teeth 37 which are adapted to be engaged by the pawls 36 during normal operation. When the engine slows down or stops, the continued rotation of the spindle 19 and propeller 8 causes the pawls to be forced into the pockets 35, the propeller 8 then revolving freely and not being subject to the drag of the engine.

The pawls 36 may be gravity operated or they may be provided with springs 38 secured at 39, as shown, said springs tending to urge the pawls toward the ratchet 37.

To prevent vibration of the shell 5 in relation to the collar 15, I provide screws 40 which are entered through the shell 5 and having their tips engaged with the collar 15.

In brief, the engine may be started by turning the propeller 8 by hand, the pawls 36 then engaging the ratchet 37. When the engine starts, and while it is normally operating, the auxiliary propeller 8, the spindle 19, the collar 15, and the shell 5 turn as a unit with the propeller shaft 2 and the propeller 34. If, however, the engine should stop or slow down, the propeller 8 will freely revolve, the ratchet 37 pressing the pawls 36 back into their pockets. The continued rotation of the supplemental propeller gives stability to the aeroplane so that the operator may maintain its equilibrium until he makes a safe landing or until the engine again functions properly to couple the collar 15 to the spindle 19, thus nose dives and tail spins are overcome and the operation of the aeroplane is rendered much safer.

What I claim is:

1. A safety attachment for aeroplane propellers, comprising a shell adapted to be attached to the main propeller shaft, a main propeller, a spindle mounted to turn within said shell, a supplemental propeller attached to said spindle, and a releasable clutch for connecting the spindle to the main propeller shaft, said clutch enabling the supplemental propeller to rotate with the main propeller and to continue to rotate independently thereof after the main propeller slows down or stops.

2. A safety attachment for aeroplane propellers, comprising a shell adapted to be attached to the main propeller shaft, a main propeller, a spindle mounted to turn within said shell, a supplemental propeller attached to said spindle, a thrust bearing connected to said shell, said spindle being seated on said thrust bearing, and an automatically releasable clutch for connecting the spindle to the main propeller shaft, said clutch enabling the supplemental propeller to rotate with the main propeller and to continue to rotate independently thereof after the main propeller slows down or stops.

In testimony whereof I affix my signature.

THOMAS CLEVELAND LUTON.